United States Patent
Dingsor et al.

(10) Patent No.: US 7,058,727 B2
(45) Date of Patent: Jun. 6, 2006

(54) METHOD AND APPARATUS LOAD BALANCING SERVER DAEMONS WITHIN A SERVER

(75) Inventors: Andrew Dwight Dingsor, Durham, NC (US); Stephen Manuel Fontes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 09/976,126

(22) Filed: Oct. 11, 2001

(65) Prior Publication Data

US 2002/0083199 A1 Jun. 27, 2002

Related U.S. Application Data

(62) Division of application No. 09/161,905, filed on Sep. 28, 1998, now abandoned.

(51) Int. Cl.
*G06F 15/16* (2006.01)

(52) U.S. Cl. ........................................ 709/245; 709/228
(58) Field of Classification Search ................ 709/245, 709/225, 203, 228, 238, 230
See application file for complete search history.

(56) References Cited

U.S. PATENT DOCUMENTS

| | | | |
|---|---|---|---|
| 5,023,907 A | | 6/1991 | Johnson et al. |
| 5,371,852 A | | 12/1994 | Attanasio et al. |
| 5,603,059 A | * | 2/1997 | Churchill et al. ............. 710/36 |
| 5,729,714 A | | 3/1998 | Dei |
| 5,774,660 A | | 6/1998 | Brendel et al. |
| 5,784,566 A | * | 7/1998 | Viavant et al. ............. 709/229 |
| 5,894,554 A | * | 4/1999 | Lowery et al. ............. 709/203 |
| 5,978,577 A | | 11/1999 | Reirden et al. |
| 5,993,038 A | | 11/1999 | Sitbon et al. |
| 6,047,323 A | | 4/2000 | Krause |
| 6,058,414 A | | 5/2000 | Manikundalam et al. |
| 6,061,349 A | | 5/2000 | Coile et al. |
| 6,070,191 A | | 5/2000 | Narendran et al. |
| 6,081,883 A | | 6/2000 | Popelka et al. |
| 6,119,143 A | | 9/2000 | Dias et al. |
| 6,163,797 A | * | 12/2000 | Eckley et al. ............... 709/203 |
| 6,182,139 B1 | | 1/2001 | Brendel |
| 6,247,012 B1 | | 6/2001 | Kitamura et al. |
| 6,249,294 B1 | * | 6/2001 | Lefebvre et al. ............ 345/504 |

(Continued)

OTHER PUBLICATIONS

Jung-Hoon-Lee et al., "A real-time traffic control scheme of multiple AGV systems for collision free minimum time motion: a routing table approach", IEEE Trans on Systems Man Cybernetics Part A, v 28, n 3, p. 347-358, May 1998.*

(Continued)

*Primary Examiner*—Patrice Winder
(74) *Attorney, Agent, or Firm*—Duke W. Yee; Martin J. McKinley; Gerald H. Glanzman

(57) ABSTRACT

A method and apparatus in a data processing system for binding a plurality of server daemons to a destination address and port. A request for a connection from a client is routed using a destination address. A server daemon within the plurality of server daemons is selected to form a selected server daemon. The request is routed to the selected server daemon by changing the destination address to a server address for the selected server daemon. When a response is returned, source address in the response is changed to the original destination address.

9 Claims, 5 Drawing Sheets

U.S. PATENT DOCUMENTS

| | | |
|---|---|---|
| 6,718,550 B1 * | 4/2004 | Lim et al. |
| 2002/0083199 A1 * | 6/2002 | Dingsor et al. ............. 709/245 |
| 2002/0108723 A1 * | 8/2002 | Lee ........................... 160/236 |

OTHER PUBLICATIONS

Shiuh-Pyng-Shieh et al., "Network address translators: effects on security protocols and applications in the TCP/IP stack", IEEE Internet Computing, v 4, n 6, p. 42-49, Dec. 2000.*

Zhiruo, C. et al., "Performance of Hashing-Based Schemes for Internet Load Balancing", IEEE INFOCOM 2000, ISBN: 0-7803-5880-5, pp. 332-341.

Lundberg, L., "Evaluating the Performance Implications of Binding Threads to Processors", IEEE Conference, ISBN: 0-8186-8067-9, pp. 393-400.

Jie, Li, "Load Balancing Problems for Muliclass Jobs in Distributed/Parallel Computer Systems", IEEE Transactions, ISSN: 0018-9340, pp. 322-332.

* cited by examiner

FIG. 1
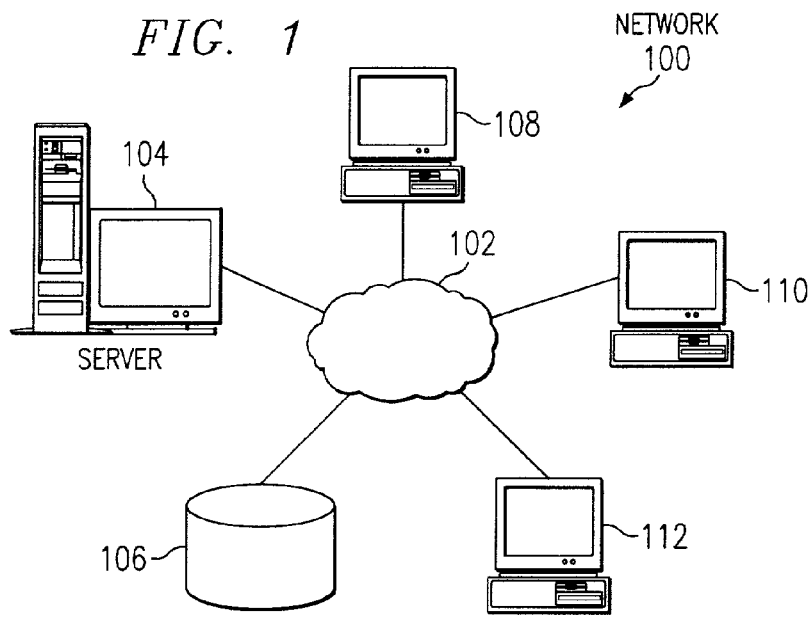
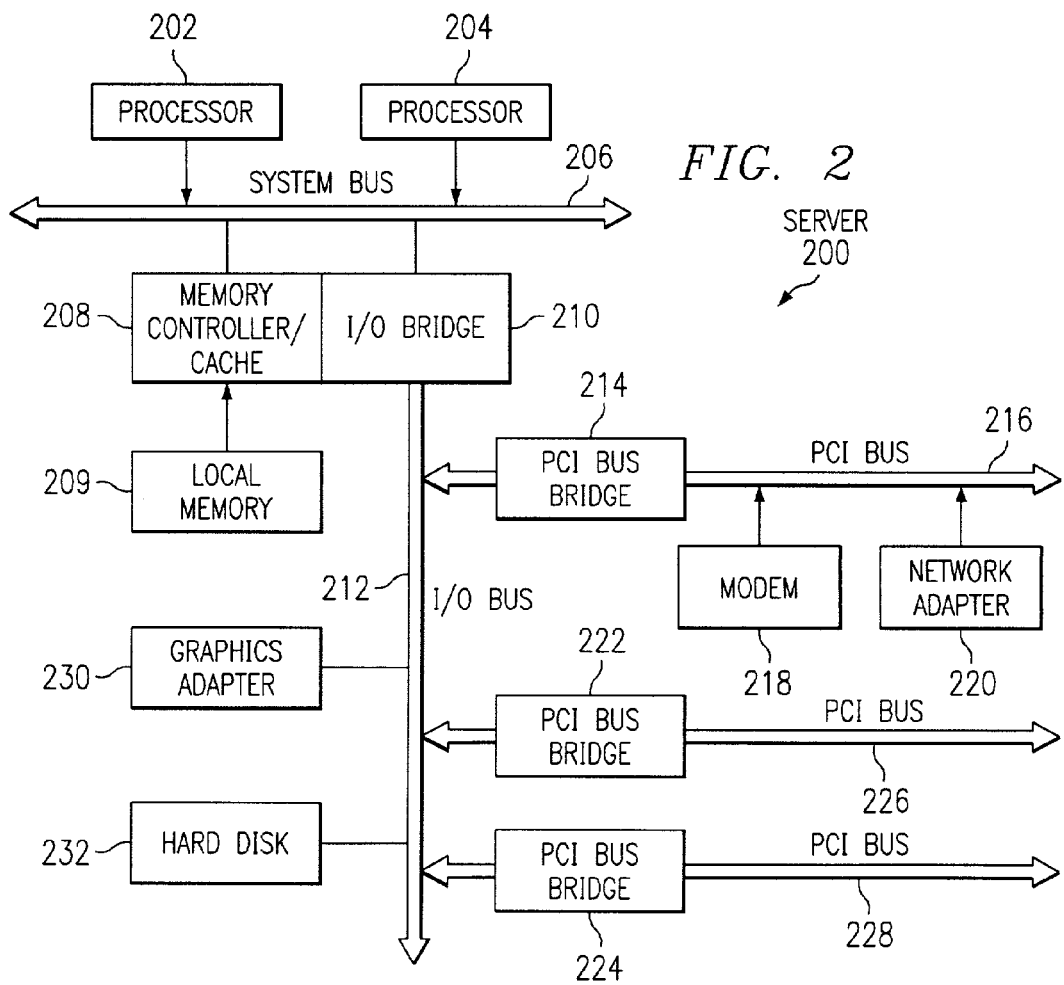
FIG. 2

METHOD AND APPARATUS LOAD BALANCING SERVER DAEMONS WITHIN A SERVER

This application is a divisional of application Ser. No. 09/161,905, filed Sep. 28, 1998, abandoned.

BACKGROUND OF THE INVENTION

1. Technical Field

The present invention relates generally to an improved distributed data processing system, in particular to a method and apparatus for improving performance and availability of a server. Still more particularly, the present invention relates to method and apparatus for improving server performance and availability of a server in a distributed data processing system through binding server daemons within the server.

2. Description of Related Art

Internet, also referred to as an "internetwork", in communications is a set of computer networks, possibly dissimilar, joined together by means of gateways that handle data transfer and the conversion of messages from the sending network to the protocols used-by the receiving network (with packets if necessary). When capitalized, the term "Internet" refers to the collection of networks and gateways that use the TCP/IP suite of protocols. TCP/IP stands for Transmission Control Protocol/Internet Protocol. This protocol was developed by the Department of Defense for communications between computers. It is built into the UNIX system and has become the de facto standard for data transmission over networks, including the Internet.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed mechanism of transferring data over the Internet is the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources, including web sites, identified by a Uniform Resource Locator (URL). A is URL is a special syntax identifier defining a communications path to specific information. Each logical block of information accessible to a client, called a "page" or a "web page", is identified by a URL. The URL provides a universal, consistent method for finding and accessing this information by the web "browser". A browser is a program capable of submitting a request for information identified by a URL at the client machine. Retrieval of information on the web is generally accomplished with an HTML-compatible browser, such as, for example, Netscape Communicator, which is available from Netscape Communications Corporation.

A web site is typically located on a server, which in some cases may support multiple web sites. Many times, a web site can crawl when traffic on the web site is too heavy. As a result, popularity of a web site can be a detriment because the site cannot handle the amount of traffic that the site is receiving. One mechanism used to increase performance of web site is to implement a server with more capacity and processing power or to employ multiple servers to handle the web site. With a larger server, a problem of single point failure is still present. If the server fails, the web site will be unavailable until the server can be repaired or replaced. Multiple servers are employed to solve that problem. With multiple servers, however, the performance of the web site may be increased, but individual servers may be under utilized. In addition, the contents for a web site are replicated on each server.

As a result, it is desirable to improve performance and availability of a server by load balancing among multiple server daemons running on one server with all server daemons responding to the same IP address and port number. Presently, however, additional capacity to support increased throughput on one server machine can only be achieved with multiple server daemons bound to different IP addresses or port numbers. This situation is due to an architectural basic limitation in TCP/IP, wherein TCP can deliver a received packet with a unique destination address and port number combination to only one server daemon.

Therefore, it would be advantageous to have an improved method and apparatus to increase availability and performance of a server without the different IP address and port number limitation.

SUMMARY OF THE INVENTION

The present invention provides a method and apparatus in a data processing system for binding a plurality of server daemons to a destination address and port. A request for a connection from a client is routed using a destination address. A server daemon within the plurality of server daemons is selected to form a selected server daemon. The request is routed to the selected server daemon by changing the destination address to a server address for the selected server daemon. When a response is returned, source address in the response is changed to the original destination address.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a distributed data processing system in which the present invention may be implemented is depicted;

FIG. 2 is a block diagram of a data processing system, which may be implemented as a server, in accordance to the present invention;

DETAILED DESCRIPTION OF THE PREFERRED EMBODIMENT

Figure 3:
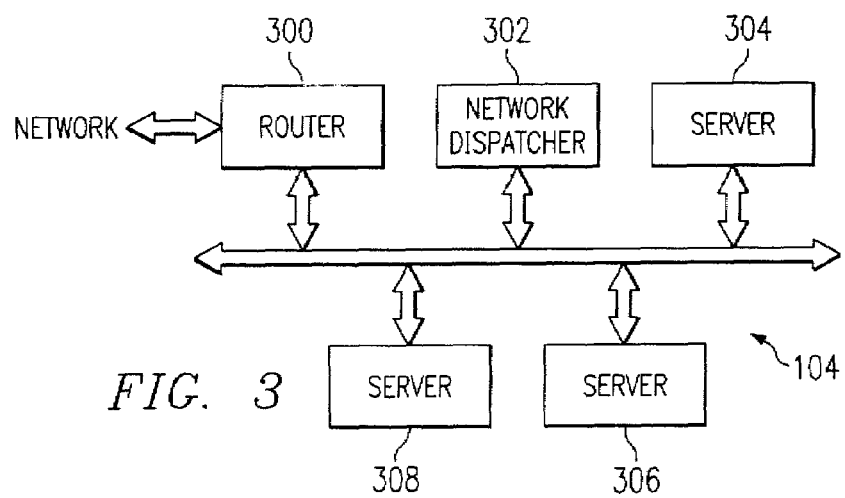
FIG. 3 is a diagram of server system containing individual servers in which the processes of the present invention may be implemented in accordance with a preferred embodiment of the present invention.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data -processing system 100. Network 102 may include permanent connections, such as wire or fiber optic cables, or temporary connections made through telephone connections.

In the depicted example, a server system 104 is connected to network 102 along with storage unit 106. Server system 104 may include one or more servers connected to each other in the depicted example. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server system 104 provides data, such as, for example, boot files, operating system images, and applications to clients 108–112. Clients 108, 110, and 112 are clients to server system 104. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as for example, an intranet or a local area network.

FIG. 1 is intended as an example, and not as an architectural limitation for the processes of the present invention.

Referring to FIG. 2, a block diagram of a data processing system, which may be implemented as a server, is depicted in accordance to the present invention. In the instance that server system 104 is implemented as a single server, data processing system 200 may be used as the server. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 is connected to I/O bus 212 and provides an interface to PCI local bus 216. A number of modems 218–220 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide 15 id interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

With reference now to FIG. 3, a diagram of a server system is depicted in accordance with a preferred embodiment of the present invention. The processes of the present invention are used within a single data processing system, such as the computer illustrated in FIG. 2. In accordance with a preferred embodiment of the present invention, the processes of the present invention may be implemented in multiple servers as illustrated in FIG. 3 in a tiered configuration with other load balancing mechanisms. Server system 104 from FIG. 1 in the depicted example is configured with a router 300, a load balancing data processing system 302 and servers 304–308. Corresponding reference numbers in different figures represent corresponding components unless specified otherwise. Router 300 receives packets destined for server system 104 from network 102. Load balancing data processing system 302 routes packets received by router 300 to an appropriate server from servers 304–308. In the depicted example, load balancing data processing system 302 employs load balancing processes to maximize efficiency in processing requests from various clients. One or more of the servers in servers 304–308 may implement the processes of the present invention. These servers may be implemented using a server such as data processing system 200 in FIG. 2. The server system illustrated in FIG. 3 is not intended to imply architectural limitations to a server system implementation of the present invention.

The present invention provides a method, apparatus, and instructions for binding multiple server daemons in a server data processing system to the same IP address and port number. In particular, when a packet is received by the TCP/IP stack in a server, the TCP can pass the packet up to only one daemon which is listening on that address and port. The processes of the present invention changes the destination internet protocol (IP) address in the packet that is inbound or received by the server. An IP address is a 32-bit (4-byte) binary number that uniquely identifies a host (computer) connected to the Internet to other Internet hosts, for the purposes of communication through the transfer of packets. An IP address is expressed in "dotted quad" format, consisting of the decimal values of its four bytes, separated with periods; for example, 127.0.0.1. The first one, two, or three bytes of the IP address, assigned by InterNIC Registration Services, identify the network the host is connected to; the remaining bits identify the host itself. The 32 bits of all 4 bytes together can signify almost 232, or roughly 4 billion, hosts. This IP address is changed back to its original value when the packet is outbound or being sent out of the server. In this manner, a number of different server daemons may be used to handle packets destined for the same destination IP address.

Although the processes described are for implementation within a server, one or more of the servers in FIG. 3 may implement the processes and instructions of the present invention in the configuration shown in FIG. 3 or in other configurations in which multiple servers are placed into a tiered configuration with load balancing processes.

Figure 4:
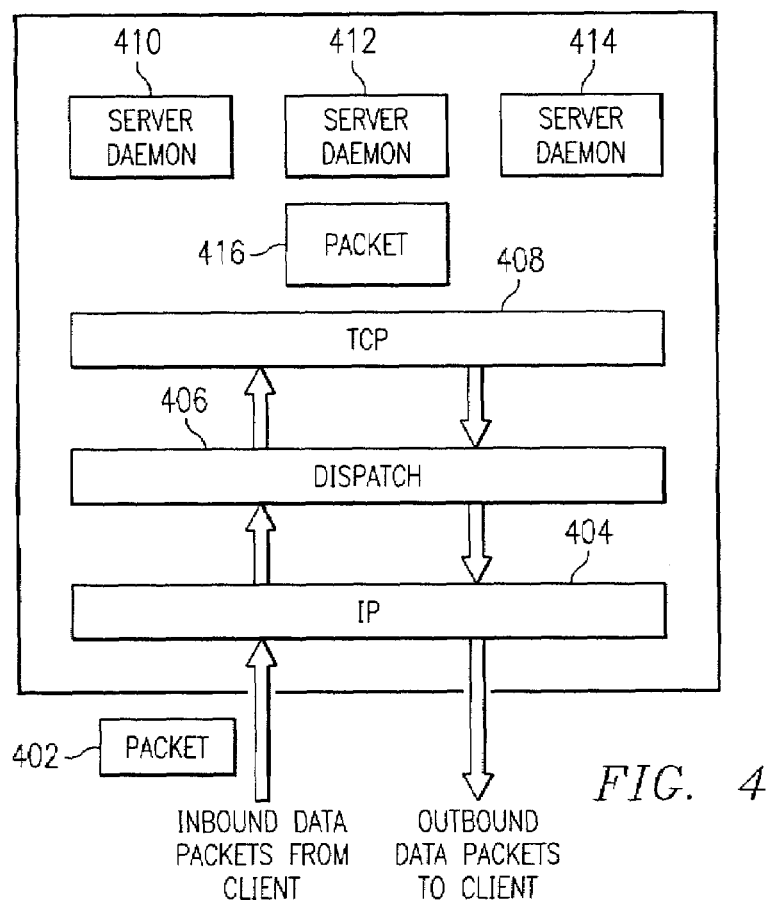
FIG. 4 is a diagram of data flow in a server in accordance with a preferred embodiment of the present invention.

With reference now to FIG. 4, a diagram of data flow in a server is depicted in accordance with a preferred embodiment of the present invention. This figure illustrates the flow of packets through a server, such as one used in server system 104. Although FIG. 4 provides an example using TCP, the present invention is not limited to TCP and may be applied to other transport layer protocols, such as, for example, User Datagram Protocol (UDP). The server illustrated in FIG. 4 receives packets from clients and sends packets back to clients. A packet 402 is received at Internet Protocol (IP) layer 404. IP layer 404 incorporates the protocol within TCP/IP that governs the breakup of data messages into packets, the routing of the packets from sender to destination network and station, and the reassembly of the packets into the original data messages at the destination. IP corresponds to the network layer in the ISO/OSI model.

Packet 402 is processed by IP layer 404 and passed on to dispatch layer 406, which provides the routing mechanism used to route packets to different server daemons. In accordance with a preferred embodiment of the present invention, dispatch layer 406 is inserted between IP layer 404 and Transmission Control Protocol (TCP) layer 408. The mechanism incorporated within dispatch layer 406 allows for a number of server daemons, such as server daemons 410–414, to monitor or service the same IP address in fashion that is transparent to a client. Dispatch layer 406 may change the destination IP address in packet 402 to route packet 402 to the appropriate server daemon if more than one server daemon is available to process requests made to the same destination IP address.

When packets are sent back from a server daemon for transmission to a client, dispatch layer 406 will change the destination IP address back to the original address. Dispatch layer 406 tracks the changes, if any, to the destination IP address so that the destination IP address may be changed back to the original address when a packet is to be returned to the client. This feature of changing and restoring the destination IP address is transparent to the client.

The packet sent from dispatch layer 406 to TCP layer 408, which includes the protocol within TCP/IP that governs the breakup of data messages into packets to be sent via IP, and the reassembly and verification of the complete messages from packets received by IP. TCP corresponds to the transport layer in the ISO/OSI model. TCP layer 408 sends the packet to a server daemon, such as server daemons 410–414, depending on the destination IP address in the packet.

When a packet, such as packet 416, is sent from one of the server daemons for transport to a client, TCP layer 408 will receive the packet and process it according to TCP protocols. Packet 416 is then sent to dispatch layer 406, which will determine if the destination IP address for the incoming packet to the server daemon was changed. If the destination IP address was changed, the destination IP address in packet 416 is changed back to the original address. Packet 416 will then be passed to IP layer 404 for processing and then sent to the client.

Although the depicted example, dispatch layer 406 is located between TCP layer 408 and IP layer 404, dispatch layer 406 may be located in other places below TCP layer 408. For example, dispatch layer 406 could be located below IP layer 404. In addition, the processes in dispatch layer 406 could be implemented within IP layer 404 itself.

Figure 5:
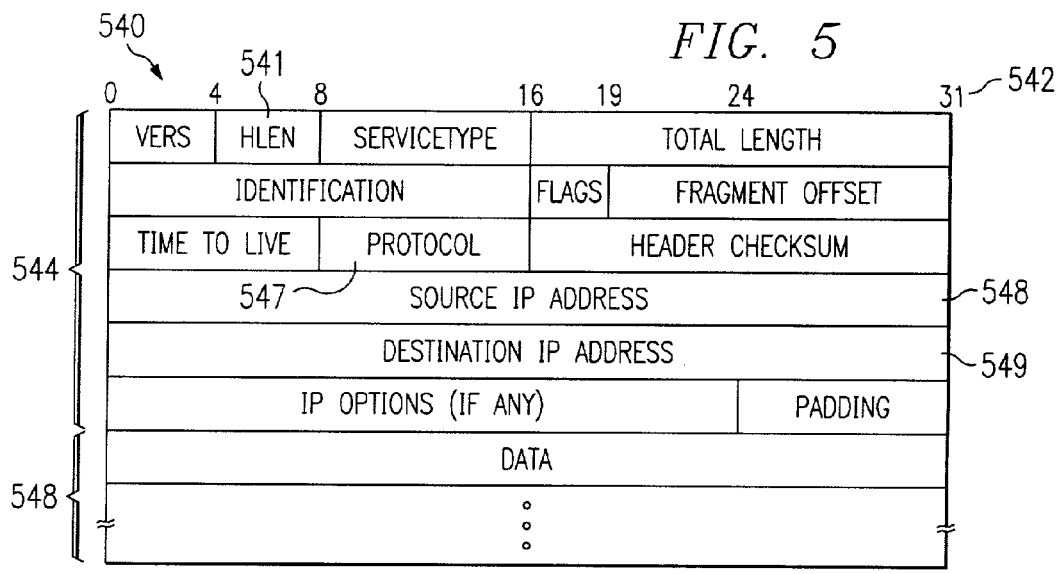
FIG. 5 is a diagram of an IP header in accordance with a preferred embodiment of the present invention.

Turning to FIG. 5, a diagram of an IP header is illustrated in accordance with a preferred embodiment of the present invention. This configuration 540 shows organization of an IP header and IP data area. Configuration 540 is shown as a sequence of 32 bit words. The first six words in the sequence are the IP header 544 and the remaining words are in IP data area 546. The numbers 542 across the top of the configuration 540 show the starting bit location of the various fields in the words of the IP message. The IP fields of particular interest are the protocol field 547, source IP address field 548, and destination address field 549. Each data processing system using IP is assigned a globally unique IP address. The protocol field 547 gives information about the protocol used in the next highest layer of protocol. For instance, the protocol field 547 specifies if the next highest level will use UDP, TCP, or another protocol. The source IP address field 548 specifies the address of the computer which originated the message. The destination address field 549 specifies the address of the computer which is to receive the message. Other fields in the IP header, like total length and fragment offset, are used to breakup network datagrams into packets at the source computer and reassemble them at the destination computer. The header checksum is a checksum over the fields of the header, computed and set at the source and recomputed for verification at the destination.

Figure 6:
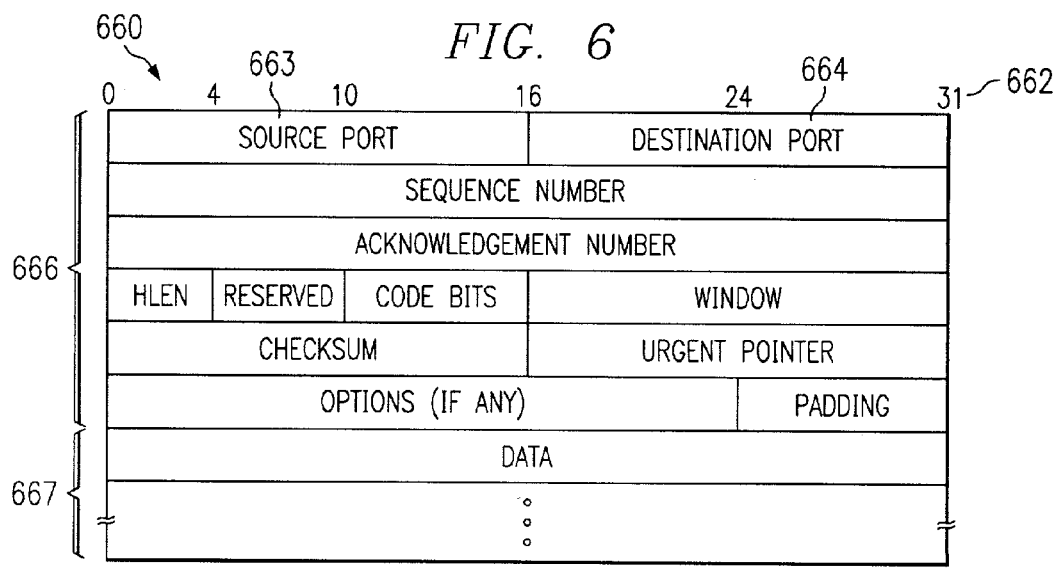
FIG. 6 is a diagram of a TCP header in accordance with a preferred embodiment of the present invention.

Next in FIG. 6, a diagram of a TCP header is illustrated in accordance with a preferred embodiment of the present invention. The TCP format is shown as a sequence of 32 bits words, the first six words being the TCP header 666 and the remaining words being the TCP data 667. The numbers 662 across the top of the TCP format 660 represent the starting bit locations of the fields in the TCP header 666. The TCP header 666, being a port type protocol, has port information in its header including a source port 663 and a destination port 664.

A TCP connection from a port on the source machine to a port on a destination machine is defined by four values: source address 648, source port 663, destination address 640, and the destination port 664 of the remote port of that machine. When the TCP protocol layer receives a TCP datagram, it uses all four values to determine which connection the data is for. Thus, on any one machine, TCP ensures that the set of active connections is unique. TCP ports are not required to be unique. The same TCP port may be used in multiple connections, as long as those connections are unique.

Figure 7:
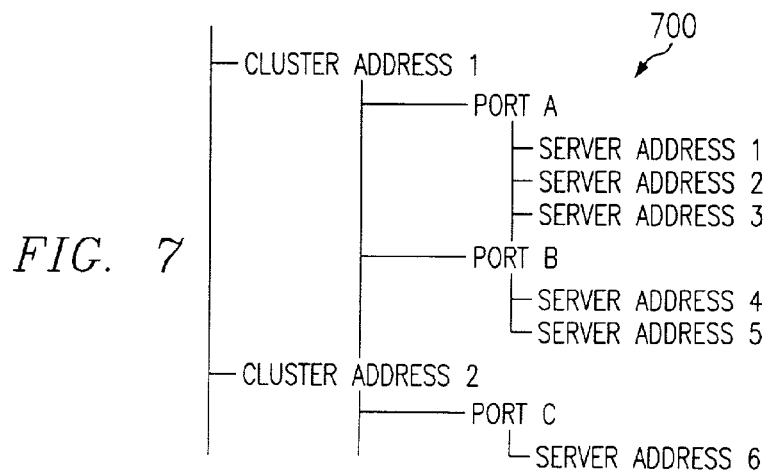
FIG. 7 is a data structure in which information may be stored in responding to requests from clients in accordance with a preferred embodiment of the present invention.

The dispatcher is configured to store information describing which server daemons are available to be used when responding to requests from clients. One possible configuration implementation is shown in FIG. 7 as a "tree view". Turning now to FIG. 7, a data structure in which information may be stored in responding to requests from clients is depicted in accordance with a preferred embodiment of the present invention. Data structure 700 relates the cluster address and port number, as targeted by the client, with the set of server daemon addresses within the server machine. Practical configurations can range from a single cluster, single port, and two servers, to multiple clusters, multiple ports, and multiple servers. In addition, ports can be configured to support TCP only, UDP only, other protocols, or all protocols.

Figure 8:
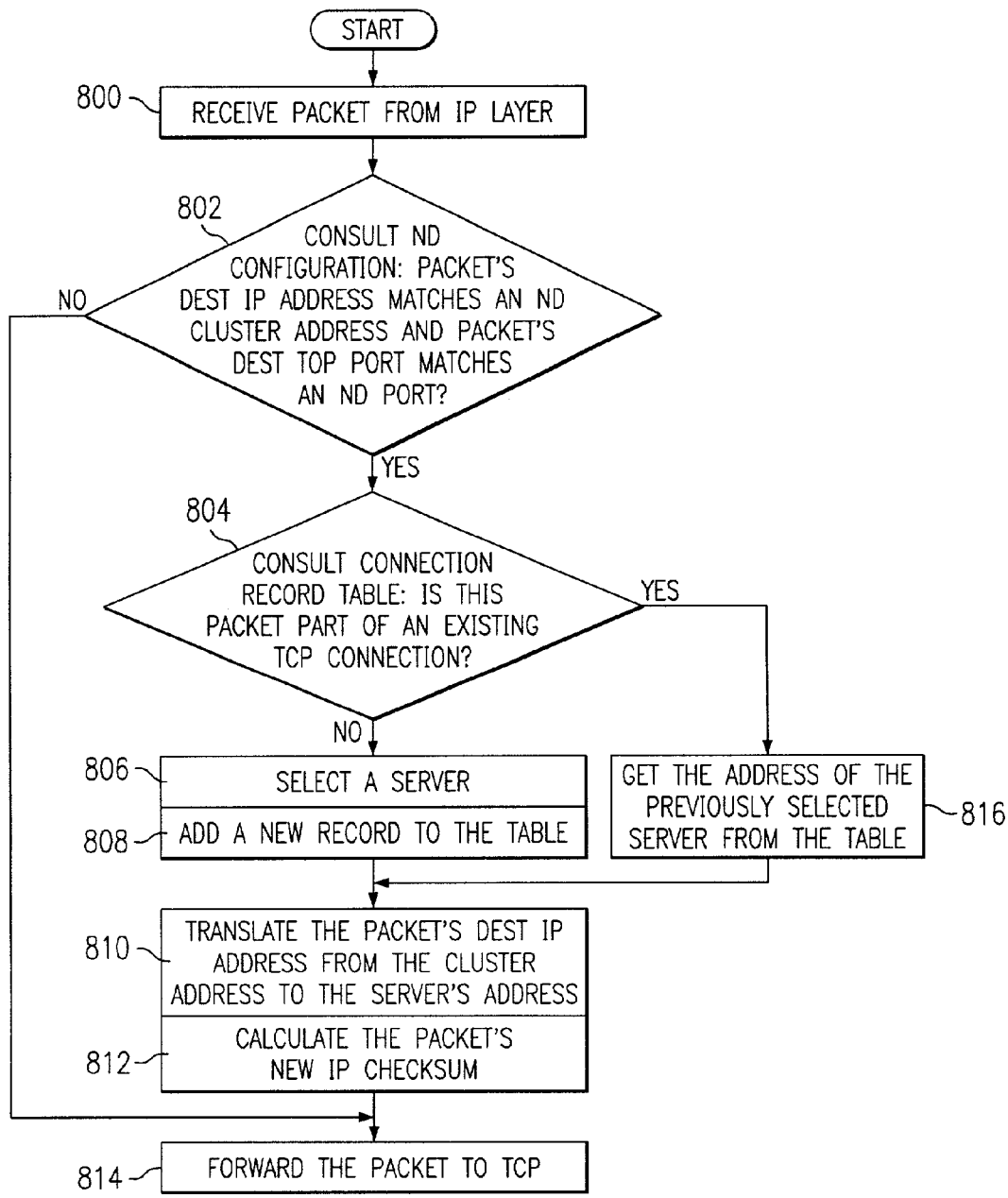
FIG. 8 is a flowchart of a process for handling inbound packets in accordance with a preferred embodiment of the present invention.

With reference now to FIG. 8, a flowchart of a process for handling inbound packets is depicted in accordance with a preferred embodiment of the present invention. In the depicted example, this process is employed by dispatch layer 406 in FIG. 4 to process a packet received by a server having multiple daemons designated to handle the same destination IP address. The process begins by receiving a packet from the IP layer (step 800). A determination is made as to whether the destination IP address of the packet matches a ND cluster address and whether the destination TCP port matches a ND port. Step 802 is performed by consulting a ND configuration. In the depicted examples, a "cluster address" is an IP address known to clients as an address of the target. The cluster address is used by the client to access or send requests to the target. Referring to the dispatcher data structure in FIG. 7, the destination IP address in the received packet is first considered. If the destination address matches a configured dispatcher cluster address, then the port numbers are considered. If the destination port number in the packet matches one of the port numbers configured under that cluster address, then the packet will be handled by the dispatcher.

Then, a determination is made as to whether the packet is part of an existing TCP connection (step 804). The determination in step 804 is made by consulting a connection record table maintained by dispatch layer 406, which is described in more detail below in FIG. 10. If the packet is not part of an existing connection, a daemon server is selected (step 806). This selection may be made in a number of ways. The selections may be, for example, performed in a round robin mechanism or using any other known load balancing mechanisms. These load balancing mechanisms can range from simple round robin techniques, to sophisticated weighted round robin algorithms with active management processes. In the simple round robin case, each new client request is forwarded to the next server daemon in the configuration, regardless of the number of connections previously sent to that server, and regardless of whether that server is still responding properly. More sophisticated select servers based upon information provided by their active management processes. These processes monitor the number of new connections sent to each server, the number of connections presently active on each server, and the health of each server (via other active processes which periodically assess the response time or another parameter of each server daemon). This information is then combined and used by the load balancing algorithm to select a server daemon within the server to service the connection.

Using the selected server, a new record is then added to the connection record table (step 808). Next, the destination IP address of the packet is translated from the cluster address (the current value of the destination IP address in the packet) to the address of the server daemon selected to process the connection (step 810). A new IP checksum is then calculated for the packet taking into account the destination IP address of the server daemon (step 812). The packet is then forwarded to TCP layer 408 (step 814).

With reference again to step 804, if the packet is part of an existing connection, the address of the previously selected server is selected from the table (step 816) with the process then proceeding to step 810 as previously described. Referring back to step 802, if the destination IP address and the destination TCP port of the packet both do not match a Network Dispatch (ND) cluster address and a ND port, the packet is forwarded to TCP layer 408 in step 814. This occurs when a packet is not destined for a connection that has multiple server daemons assigned to handle the connection.

Figure 9:
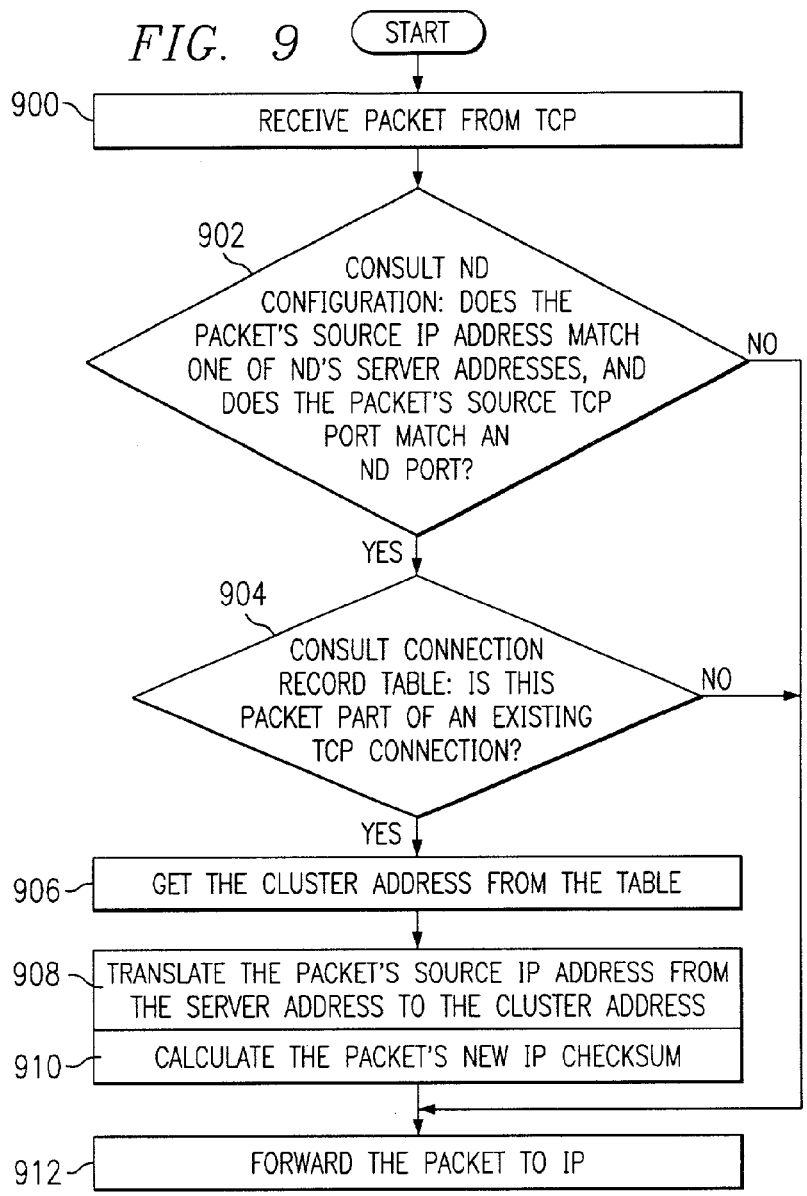
FIG. 9 is a flowchart of a process for handling outbound packets in accordance with a preferred embodiment of the present invention.

Turning next to FIG. 9, a flowchart of a process for handling outbound packets is depicted in accordance with a preferred embodiment of the present invention. In the depicted example, this process is employed by dispatch layer 406 in FIG. 4 to process a packet that is to be sent to a client from a server having multiple daemons designated to handle the same destination IP address.

The process begins by receiving a packet from the TCP layer (step 900). A determination is made as to whether the destination IP address of the packet matches one of the server addresses and whether the source TCP port matches a ND port. Step 902 is performed by consulting a ND configuration. If the source IP address matches the ND server address and the source TCP port matches a ND port, a determination is made as to whether the packet is part of an existing TCP connection (step 904). The determination in step 904 is made by consulting the connection record table, which is described in more detail below in FIG. 10. If the packet is part of an existing connection, the cluster address is obtained from the table (step 906). In the depicted example, the cluster address is obtained from the connection record table. Then, the source IP address of the packet is translated from the server daemon address to the cluster address (step 908). A new IP checksum is then calculated for the packet taking into account the destination IP address of the server daemon (step 910). The packet is then forwarded to IP layer 404 (step 912). IP layer 404 processes the packet for transmission to the client.

With reference again to step 904, if the packet is not part of an existing connection, the process then proceeds to step 912 as described above. Referring back to step 902, if the source IP address and the source TCP port of the packet both do not match a ND sever and a ND port, the packet is forwarded to IP layer 404 in step 912. This occurs when a packet is not destined for a connection that has multiple server daemons assigned to handle the connection. Some addresses may not be for server daemons or are not for connections that are assigned more than one server daemon.

Figure 10:
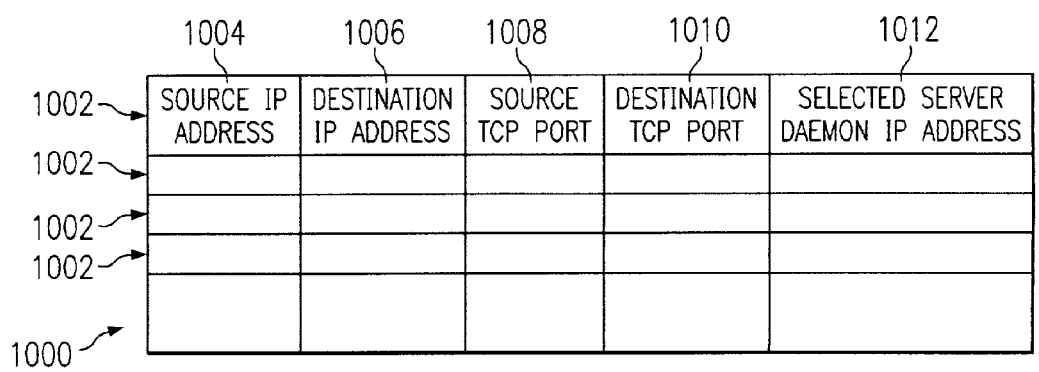
FIG. 10 is a connection record table in accordance with a preferred embodiment of the present invention.
Figure 5:
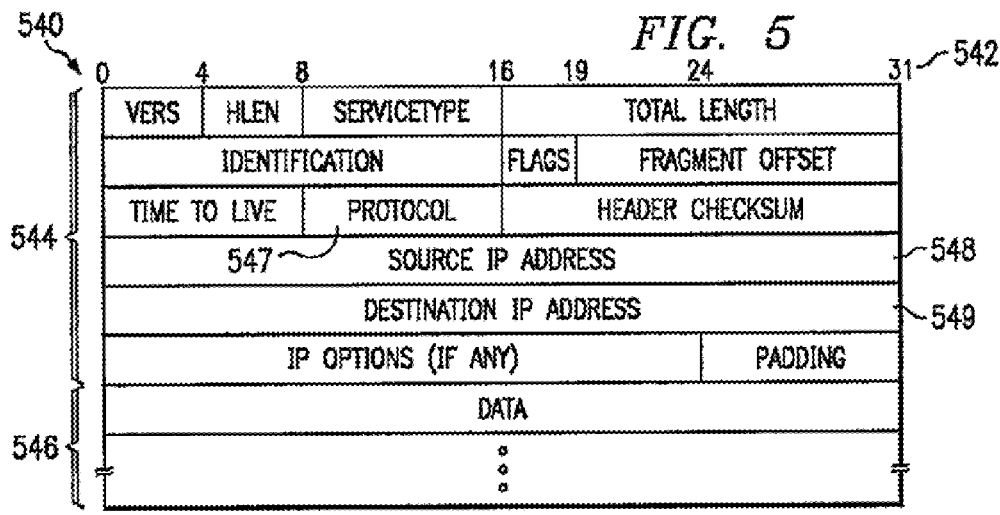
Figure 6:
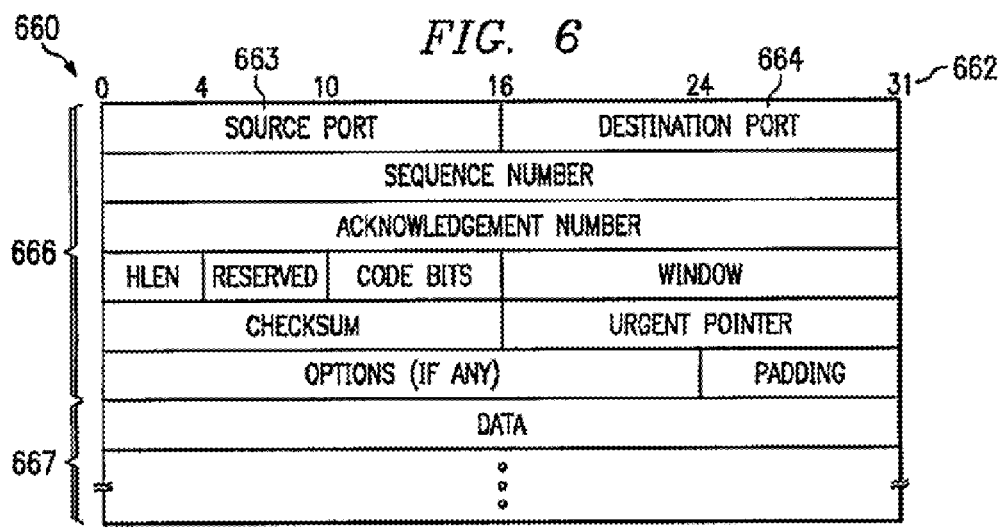
Figure 7:
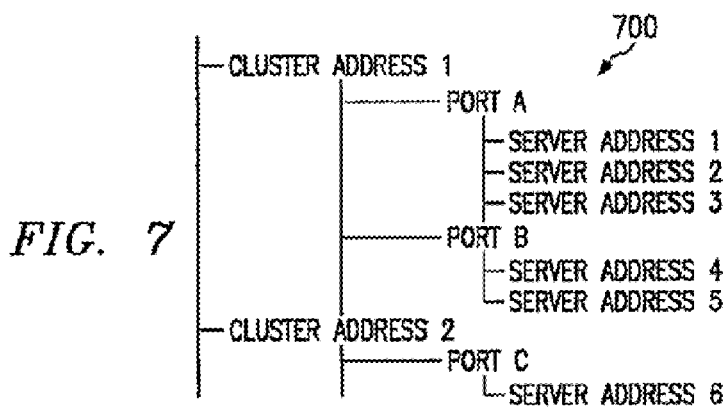
Figure 5:
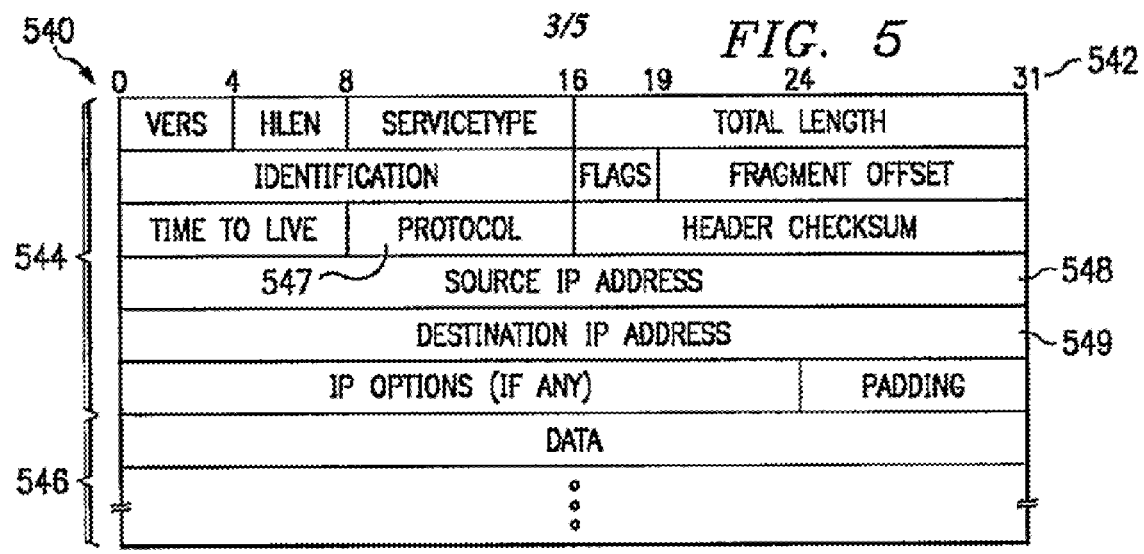
Figure 6:
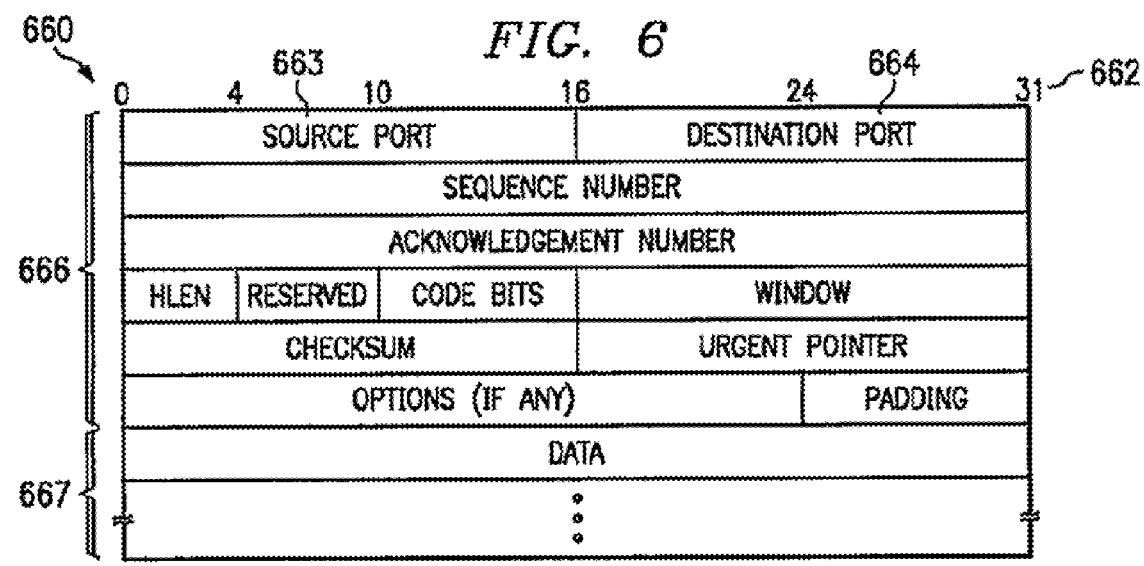
Figure 7:
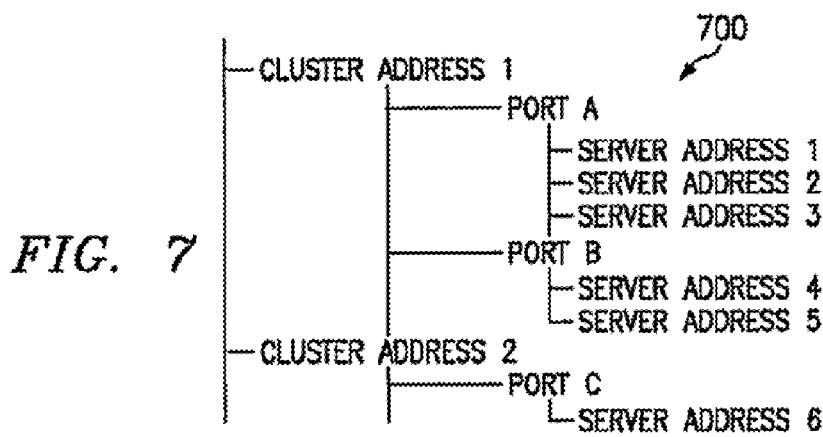

Turning now to FIG. 10, a connection record table is illustrated in accordance with a preferred embodiment of the present invent ion. Connection record table 1000 includes a number of records 1002, also referred to as entries. Each record 1002 includes form the received packet a source IP address 1004, a destination IP address 1006, a source TCP port 1008, and a destination TCP port 1010. Each record 1002 also includes the address of the server 1012 selected by the load balancing mechanism. Each record 1002 provides a mapping between the packets which flow to and from the client and the packets which flow to and from the server daemons.

In connection with steps 804 and 808 in FIG. 8, records are added to the connection record table 1000 each time a new connection is established. The two IP addresses and two port numbers from the received packet are copied into in the new entry. Following the load balancing's selection of a server daemon, that server's address is then added to the connection table entry. Then, per step 810, the destination IP address field of the received packet is changed to that of the selected server. When a connection is terminated, the connection record is removed from the table. Garbage collection mechanisms are also used to purge from the table any stale connections which have not terminated gracefully. Connection record table 1000 is employed to track connections and server daemons used to service the connections.

Through the use of connection record table 1000, dispatch layer 406 can track which daemon is servicing a particular connection and make the appropriate destination IP address translations to route incoming packets to the appropriate server daemon. With outgoing packets, connection record table 1000 is used by dispatch layer 406 to restore the source IP address to the one that was used by the client. The restoration of the source IP address in outgoing packets provides seamless handling of packets in "binding" or assigning multiple daemons to the same IP address and port number. Thus, a number of daemons can listen on the same address and port to provide increased capacity within a single server.

Further, dispatch layer 406 can be used to support multiple IP destination addresses. Multiple cluster addresses with different groups of multiple server daemons may be handled using the processes of the present invention. Thus, the present invention provides for scalable capabilities within a server.

It is important to note that while the present invention has been described in the context of a fully functioning data processing system, those of ordinary skill in the art will appreciate that the processes of the present invention are capable of being distributed in a computer program product in a form of a computer readable medium of instructions and a variety of forms and that the present invention applies equally regardless of the particular type of signal bearing media actually used to carry out the distribution.

Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, the present invention is not limited to the traditional web server, using HTTP on port 80, but may be applied to support multiple protocols and/or port numbers. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer comprising:
   a plurality of processes, wherein the plurality of processes service a destination address and have process addresses;
   a packet routing layer, wherein the packet routing layer routes packets to the plurality of processes using destination addresses within the packets;
   a dispatch layer between the packet routing layer and an IP layer, wherein the dispatch layer has a plurality of modes of operation including:
      a first mode of operation in which the dispatch layer receives a packet from a client, wherein the packet includes the destination address;
      a second mode of operation, responsive to receiving the packet, in which the dispatch layer identifies a process within the plurality of processes to service the client, wherein the process is an identified process;
      a third mode of operation in which the dispatch layer translates the destination address to a process address for the identified process within the plurality of processes; and
      a fourth mode of operation, responsive to the third mode of operation, in which the packet is sent to the packet routing layer.

2. The computer of claim 1, wherein each packet includes a source address and wherein the dispatch layer further includes:
   a fifth mode of operation in which the dispatch layer receives a second packet from the identified process for the client; and
   a sixth mode of operation, responsive to the fifth mode of operation, in which the dispatch layer translates a source address in the second packet from the process address for the identified process to the destination address of the packet received from the client.

3. A computer comprising:
   a plurality of processes, wherein the plurality of processes service a destination address and have process addresses;
   a packet routing layer, wherein the packet routing layer routes packets to the plurality of processes using a destination addresses within the packets;
   a dispatch layer between a TCP layer and an IP layer, wherein the dispatch layer has a plurality of modes of operation including:
      a first mode of operation in which the dispatch layer receives a packet from a client, wherein the packet includes the destination address;
      a second mode of operation, responsive to receiving the packet, in which the dispatch layer identifies a process within the plurality of processes to service the client, wherein the process is an identified process;
      a third mode of operation in which the dispatch layer translates the destination address to a process address for the identified process within the plurality of processes; and
      a fourth mode of operation, responsive to the third mode of operation, in which the packet is sent to the packet routing layer, wherein the second mode of operation includes:
   a first submode of operation in which a determination is made as to whether a connection exists for the client;
   a second submode of operation, responsive to a determination that a connection is absent for the client in the first submode of operation, in which a connection is created and a process within the plurality of processes is assigned to service the connection, wherein the process is the identified process; and
   a third submode of operation, responsive to a determination that a connection exists for the client, in which a process assigned to the connection is identified and forms the identified process.

4. The computer of claim 1, wherein the packet routing layer is a transmission control protocol layer.

5. The computer of claim 1, wherein the plurality of processes is a plurality of server daemons.

6. The computer of claim 3, wherein each packet includes a source address and wherein the dispatch layer further includes:
   a fifth mode of operation in which the dispatch layer receives a packet from the identified process for the client; and
   a sixth mode of operation, responsive to the fifth mode of operation, in which the dispatch layer translates the source address in the packet of the destination address.

7. The computer of claim 3, wherein the packet routing layer is a transmission control protocol layer.

8. The computer of claim 3, wherein the plurality of processes is a plurality of server daemons.

9. A computer program product for routing packets from a client to a selected process within a plurality of processes servicing a connection between a data processing system and the client comprising:
   a recordable-type computer readable medium;
   first instructions for receiving a packet for the connection between the data processing system and the client, wherein the packet includes a destination address;
   second instructions, responsive to receiving the packet, for a dispatch layer between a packet routing layer and an IP layer to identify a process within the plurality of processes to service the client;
   third instructions for translating, in the dispatch layer, the destination address to an intermediate destination address, wherein the intermediate destination address is an address for the identified process within the plurality of processes; and
   fourth instructions, responsive to the translation, for sending the packet to the packet routing layer, wherein the instructions are embodied within the recordable-type computer readable medium.

* * * * *

UNITED STATES PATENT AND TRADEMARK OFFICE
CERTIFICATE OF CORRECTION

| | |
|---|---|
| PATENT NO. | : 7,058,727 B2 |
| APPLICATION NO. | : 09/976126 |
| DATED | : June 6, 2006 |
| INVENTOR(S) | : Dingsor et al. |

It is certified that error appears in the above-identified patent and that said Letters Patent is hereby corrected as shown below:

Please delete FIG. 5 and replace with FIG. 5 REPLACEMENT SHEET.

Col. 4, line 21: after "provide" delete "15 id".

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 7,058,727 B2  Page 1 of 2
APPLICATION NO. : 09/976126
DATED : June 6, 2006
INVENTOR(S) : Dingsor et al.

It is certified that error appears in the above-identified patent and that said Letters Patent is hereby corrected as shown below:

Please delete FIG. 5 and replace with FIG. 5 REPLACEMENT SHEET. Attached.

Col. 4, line 21: after "provide" delete "15 id".

Signed and Sealed this

Sixteenth Day of October, 2007

JON W. DUDAS
*Director of the United States Patent and Trademark Office*